Sept. 4, 1945.   M. J. SCANLON   2,384,401
INTERNAL-COMBUSTION ENGINE
Filed Dec. 7, 1943   2 Sheets-Sheet 1
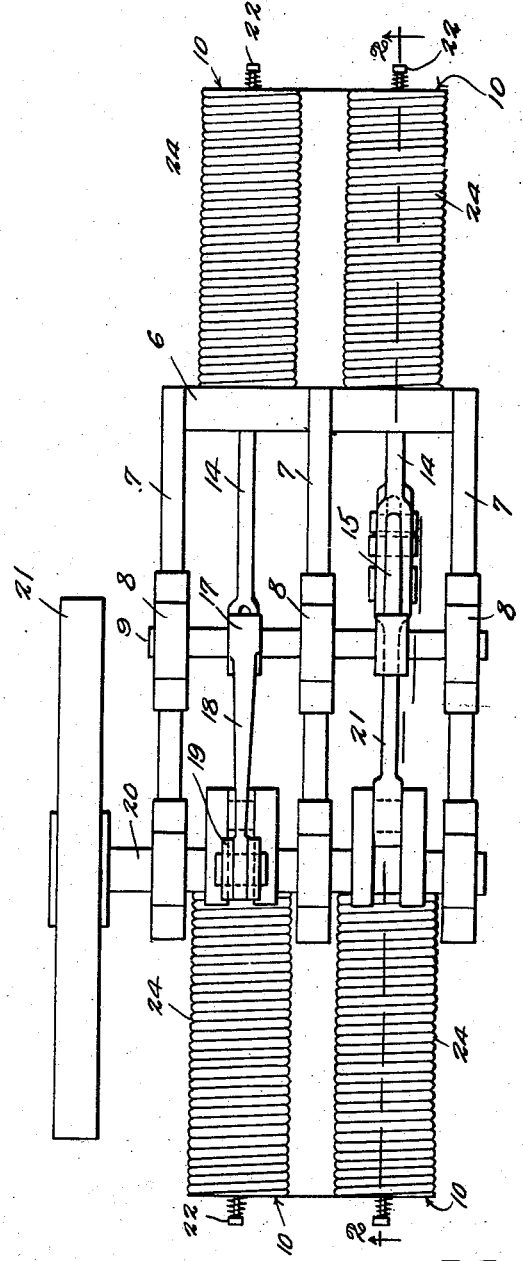
M. J. Scanlon
INVENTOR.
BY
ATTORNEYS.

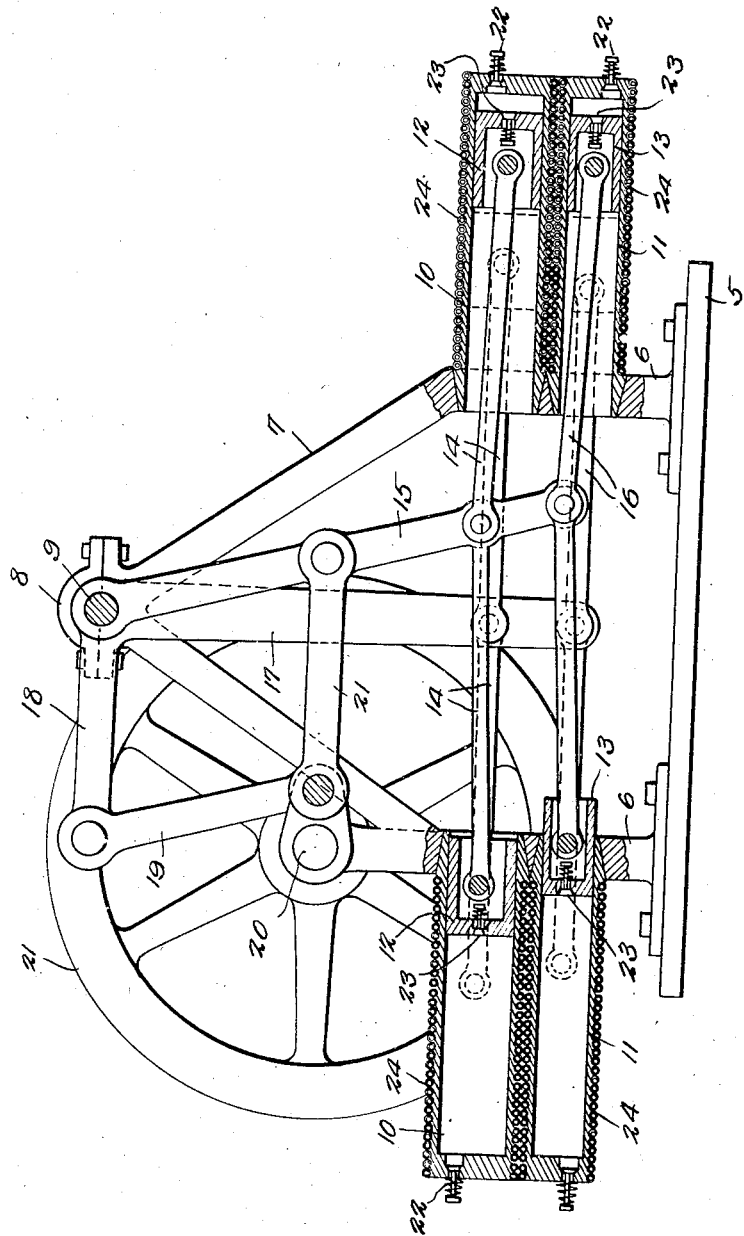

Patented Sept. 4, 1945

2,384,401

UNITED STATES PATENT OFFICE 2,384,401

INTERNAL-COMBUSTION ENGINE

Michael Joseph Scanlon, Baltimore, Md.

Application December 7, 1943, Serial No. 513,289

1 Claim. (Cl. 123—54)

This invention relates to internal combustion engines, the primary object of the invention being to provide a multicylinder engine wherein the cylinders are opposed, and the connecting rods of the pistons operating within the opposed cylinders, are arranged to provide an exceptionally powerful and quiet motor.

Another object of the invention is to provide means for connecting the piston rods with the crank shaft of an internal combustion engine, embodying a series of levers, arranged in such a way that the thrust of the piston rods of the opposed pistons will be in a more direct line than in normal engine construction, lateral thrust of the piston rods being reduced to a minimum, thereby increasing the driving power of the engine.

Still another object of the invention is to provide a connection between the piston rods of an engine and the crank shaft thereof, with a view to reduce friction and weight of the engine, by reducing the number of cranks of the crank shaft and connections between the crank shaft and piston rods.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1 is a plan view of an engine constructed in accordance with the invention.

Figure 2 is a longitudinal sectional view through the cylinders of the engine, parts of the engine being shown in elevation.

Referring to the drawings in detail, the base of the engine is indicated by the reference character 5. The reference character 6 designates the cylinder supports, that are formed with upwardly inclined bars 7, at the upper ends of which are bearings 8 in which the shaft 9 is mounted. The cylinder supports are formed with bores in which the inner tapered ends of the cylinders 10 and 11 are mounted, the cylinders 10 and 11 being arranged in groups at opposite sides of the engine base, the cylinders being in alignment, as clearly shown by Fig. 2 of the drawings. The cylinders 10 of each group are formed with larger bores than the cylinders 11, for purposes to be hereinafter more fully described.

Operating within the cylinders 10 are pistons 12, while the pistons 13 operate in the cylinders 11.

The connecting rods indicated at 14 connect the pistons 12 with the walking beam 15 at a point in spaced relation with the lower end of the walking beam. The piston rods 16 connect the pistons 13, with the walking beam 15, at a point adjacent to the lower end thereof. Thus it will be seen that the leverage will be increased, at the point of connection between the piston rods 16 and walking beam 15, over the leverage existing between the piston rods 14 and walking beam 15, owing to the fact that the point of connection between the piston rods 14 and walking beam 15 is nearer the pivot point of the walking beam 15 than the connection between the piston rods 16 and walking beam. The walking beam 15 is secured to the shaft 9 to move therewith, and cooperates with the walking beam 17 which is also secured to shaft 9. The walking beam 17 extends downwardly, where it connects with the piston rods 14 of the adjacent upper cylinders of the groups of cylinders, so that movement of the pistons and piston rods associated with the walking beam 17 will transmit movement thereto.

The walking beam 17 is provided with an arm 18 that connects with the lever 19 that in turn connects with a crank of the crank shaft 20. The lever 21 provides a connection between the walking beam 15 and a crank of the crank shaft 20. Thus it will be seen that due to this connection between the piston rods and walking beams, movement of the piston rods caused by the movements of the pistons connected therewith, will be directed to the rotation of crank shaft 20. Mounted on the crank shaft 20 is a fly-wheel 21.

The cylinders are provided with the usual intake valves 22 whereby the fuel charge may be drawn into the cylinders on the suction strokes of pistons to be fired in the usual and well known manner.

Valves 23 are provided in the piston heads and operate to admit air to the cylinders on the suction strokes of the pistons to aid combustion, and at the same time provide cooling means for cooling the pistons.

Surrounding the cylinders of the engine are tubular coils 24, through which a cooling liquid is circulated, maintaining the cylinders cool.

From the foregoing it will be seen that due to the construction shown and described, I have provided an engine embodying a plurality of opposed cylinders arranged in groups of upper cylinders and lower cylinders of a smaller bore than the upper cylinders, the pistons operating in the cylinders transmitting their motion to a crank shaft, through a series of walking beams and levers arranged so that the direct thrust of the piston rods is directed in a line which is substantially free of lateral thrust, thereby increasing the power of the engine.

What is claimed is:

In an internal combustion engine, groups of upper and lower engine cylinders, pistons operating in the cylinders, connecting rods connected with the pistons, the cylinders of each group being arranged in parallel relation with respect to each other, said cylinders of one group being in direct alignment with the cylinders of the opposite group, cylinder supports in which the cylinders are mounted, said cylinder supports including inclined bars connected at their upper ends providing shaft bearings, disposed above the inner ends of the cylinders, at a point on a vertical line drawn through the center of the space between the adjacent inner ends of the groups of cylinders, a horizontal shaft operating in said bearings, a crank shaft disposed above the inner ends of the cylinders of one group, and being offset with respect to the horizontal shaft and opposite cylinders, walking beams mounted on the horizontal shaft, the lower ends of said walking beams being connected with the connecting rods of aligned pistons, and adapted to operate in substantially a horizontal line, and links connecting the walking beams to the crank shaft.

MICHAEL JOSEPH SCANLON.